US010142197B2

(12) United States Patent
Nakazawa et al.

(10) Patent No.: US 10,142,197 B2
(45) Date of Patent: Nov. 27, 2018

(54) VISUALIZING DISTRIBUTIONS OF CORRELATED DATA

(71) Applicant: INTERNATIONAL BUSINESS MACHINES CORPORATION, Armonk, NY (US)

(72) Inventors: Rina Nakazawa, Tokyo (JP); Kazunori Ogata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 14/955,996

(22) Filed: Dec. 1, 2015

(65) Prior Publication Data
US 2017/0155551 A1    Jun. 1, 2017

(51) Int. Cl.
G06F 15/177    (2006.01)
H04L 12/26    (2006.01)

(52) U.S. Cl.
CPC ........ *H04L 43/045* (2013.01); *H04L 43/0888* (2013.01)

(58) Field of Classification Search
CPC ... H04L 41/083; H04L 41/22; H04L 41/0816; H04L 43/045; G06F 17/30554; G06F 17/30598
See application file for complete search history.

(56) References Cited

U.S. PATENT DOCUMENTS

| 8,073,943 | B2* | 12/2011 | Monk ................... H04L 41/22 709/224 |
| 8,762,525 | B2 | 6/2014 | Devarakonda et al. |
| 9,086,921 | B2 | 7/2015 | Weissman et al. |
| 2004/0024859 | A1* | 2/2004 | Bloch ................. H04L 43/0876 709/223 |
| 2006/0120285 | A1* | 6/2006 | Pathak .................. H04L 47/14 370/230 |
| 2009/0040932 | A1* | 2/2009 | Matityahu ............ H04L 43/045 370/241 |
| 2015/0121187 | A1* | 4/2015 | Williamson .......... H04L 41/142 715/227 |

OTHER PUBLICATIONS

Abm Moniruzzaman, Analysis of Memory Ballooning Technique for Dynamic Memory Management of Virtual Machines (VMs), International Journal of of Grid Distribution Computing, vol. 7, No. 6 (2014), pp. 81-90.
Peter J. Rousseuw, et al., The Bagplot: A Bivariate Boxplot, The American Statistician, 53:4, 382-387, Nov. 1999.
Mark A. Shovman, et al., Plot Balalaika: Simple Chart Designs for Long-Tail Distributed Data, 2015 19th International Conference on Information Visualisation, pp. 148-151.

* cited by examiner

*Primary Examiner* — Benjamin M Thieu
(74) *Attorney, Agent, or Firm* — Tutunjian & Bitetto, P.C.; Vazken Alexanian

(57) ABSTRACT

A method is described for visualizing distributions of correlated data in a computing environment in a form readable by a computer system operator, such as throughput and response time. Data is collected and a visualized representation is generated that is indicative of system performance.

17 Claims, 10 Drawing Sheets

400

Collect throughput and response time from information for >= 1 machine for a selected number of intervals of selected time duration
410

Calculate the frequency distribution of response time for throughput in a selected throughput range (k)
420

Plot throughput for the throughput range (k) on the y axis
430

Plot the frequency of throughput in a width dimension for (k) - data points for the throughput range are generated
440

Classify ranges of response time speeds in the data points into ≥ 1 classes, assign a unique visual indicator to be displayed by each class
450

Generate a visual representation
460

FIG. 4

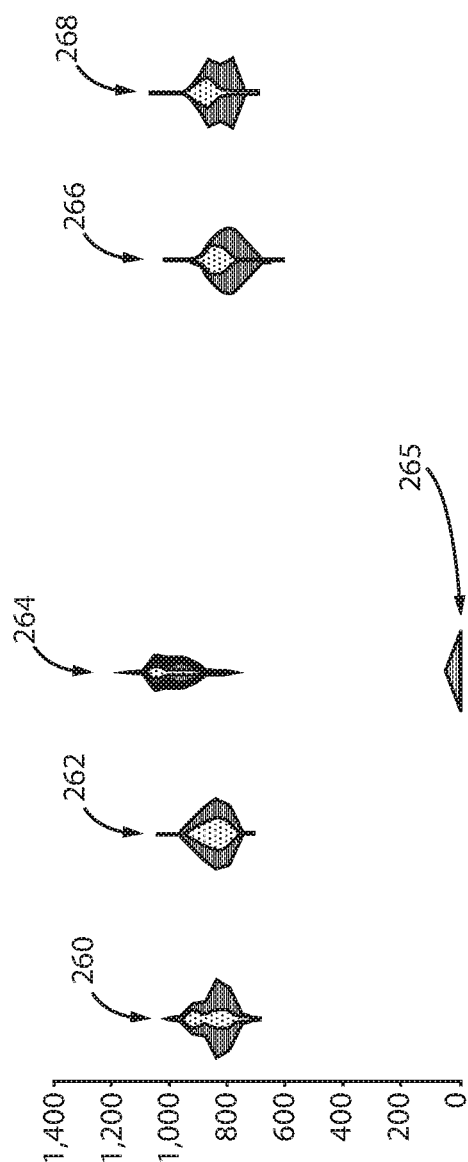

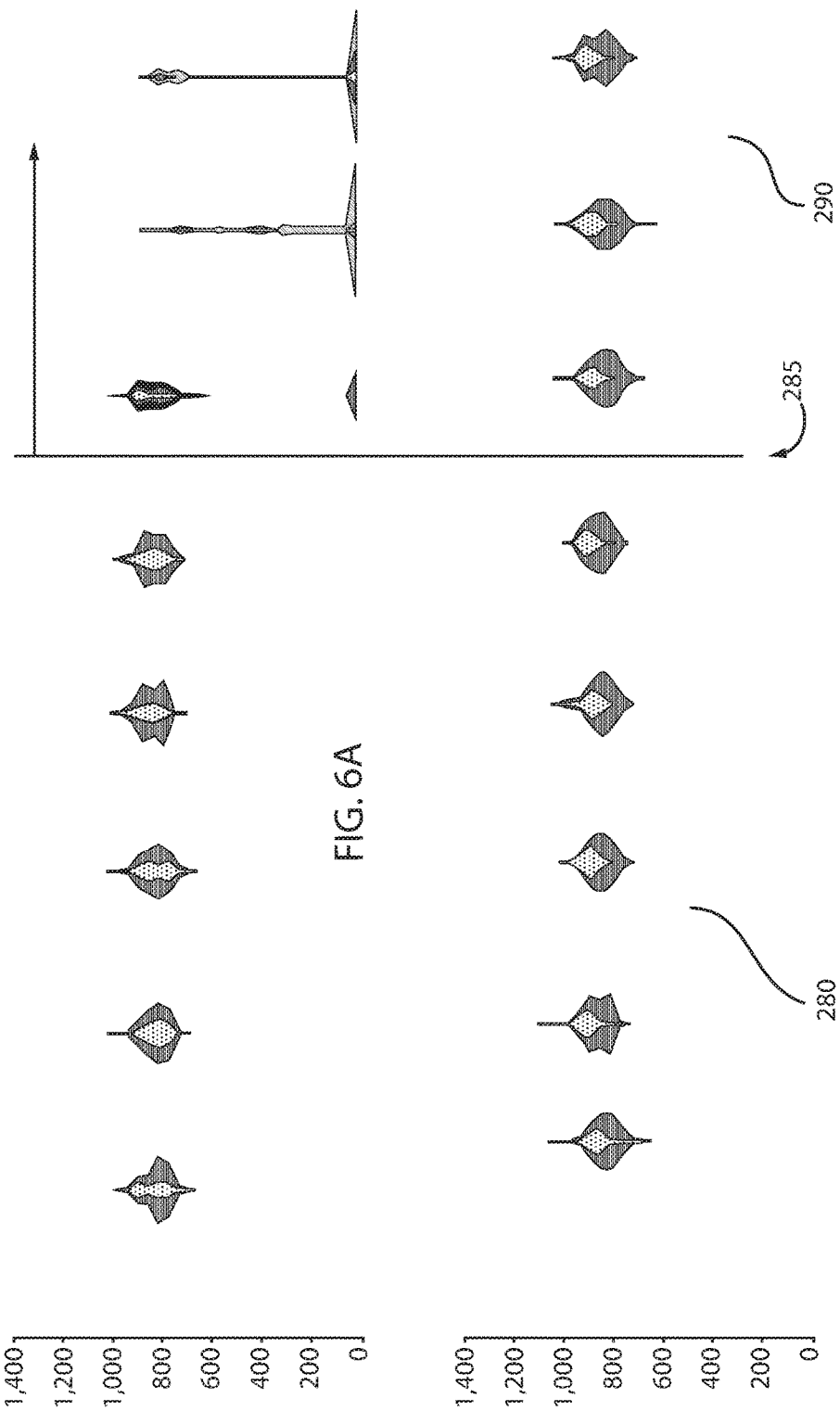

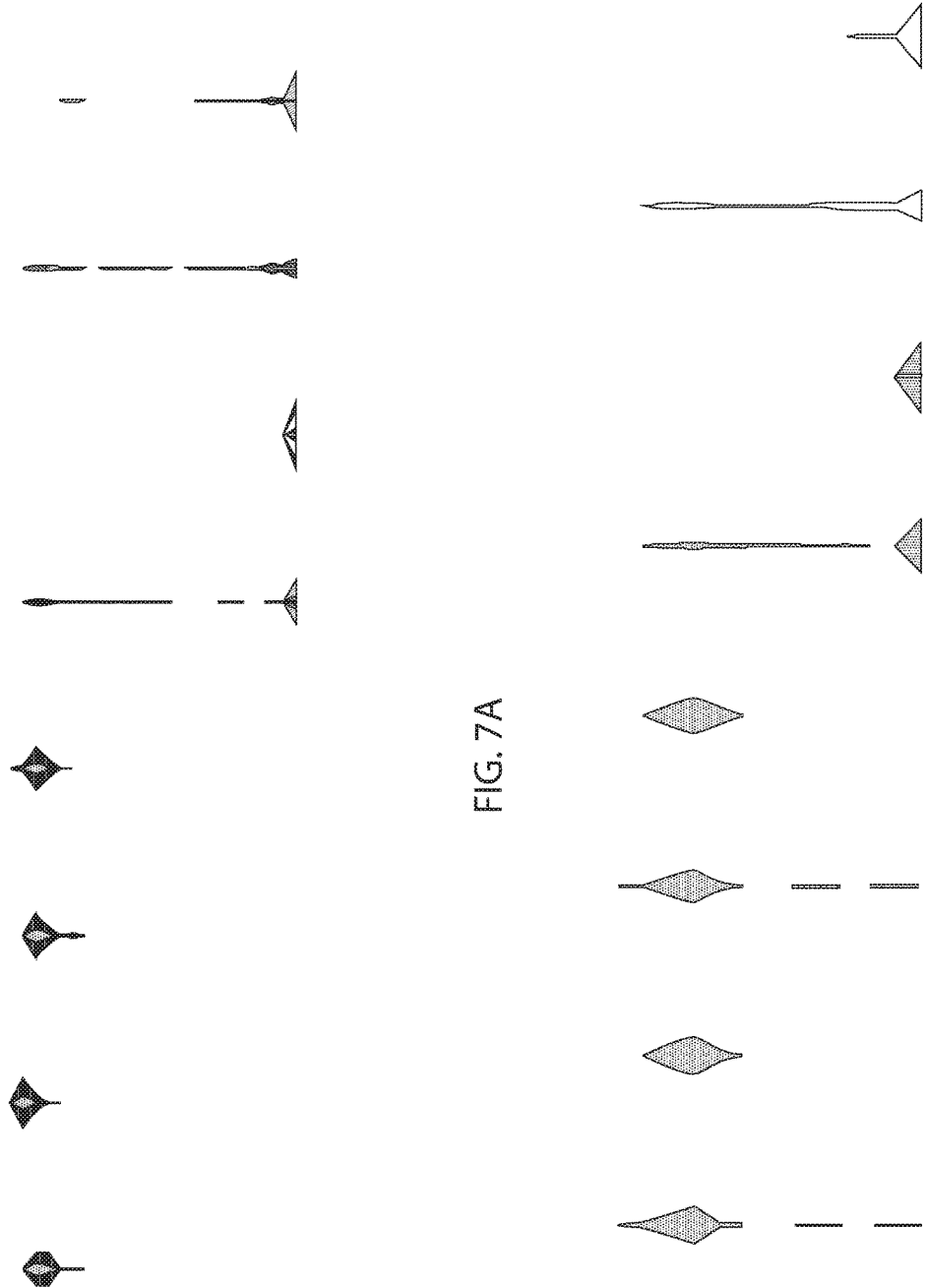

VISUALIZING DISTRIBUTIONS OF CORRELATED DATA

BACKGROUND

Technical Field

The present disclosure generally relates to systems and methods for visualizing correlated data in a computing environment, such as throughput and response time Description of the Related Art Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Examples of services include infrastructure as a service, platform as a service, storage as a service, software as a service, and business process as a service cloud services.

In a cloud computing environment, e.g., a platform-as-a-service (PaaS) cloud computing environment, there may be a number of different machine workloads at any given time. For example, some machines that are accessed continuously may have a high workload; some other machines may be accessed intermittently and have light workloads; and some other machines may be idle.

For various reasons, cloud service providers prefer to overcommit shared resources, such as memory, yet when memory is overcommitted, the machine workloads can degrade system performance. To address this, memory can be swapped, such as by adjusting swappiness. Such adjustments can have the effect of improving system performance.

The system operator could be aided by an accurate representation of throughout and response time of system resources in a computing environment when deciding whether to adjust the system with a memory swap, make another adjustment, or rely on a default setting. Such information could aid the decision making relating to tuning and improving system performance.

SUMMARY

In accordance with present principles, described is a method for visualizing distributions of correlated data in a computing environment that includes collecting correlated data for one or more computing machines in computer memory and the creation of a visualized representation of the two or more kinds of correlated data using at least one hardware processor, the visualized representation including one or more classes of information concerning computing machine performance plotted in one or more data points on a data plot, with one or more classes of correlated data included within the data points that are represented by displaying a unique visual indicator that is assigned to classes of correlated data.

In accordance with present principles, described is a system for visualizing distribution of correlated data in a computing environment that includes one or more servers having a processor including memory; a computer system data collector for collecting two or more kinds of computer system data for one or more computing machines for specified time periods; a visual information determiner for determining a visual representation of the collected data in a data plot that visually correlates the collected computer system data, the data plot having data points including one or more classes of computer system performance information; and a data display device for displaying the visual representation as an image.

In accordance with present principles, described is a computer program product for visualizing distributions of correlated data in a computing environment, the computer program product being in a non-transitory computer readable storage medium having program instructions, the program instructions being executable by a computer to cause the computer to perform a method that includes collecting correlated data for one or more computing machines and the creation of a visualized representation of the two or more kinds of correlated data, the visualized representation including one or more classes of information concerning computing machine performance plotted in one or more data points on a data plot, with one or more classes of correlated data included within the data points that are represented by displaying a unique visual indicator that is assigned to classes of correlated data.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 4 is a block diagram showing an exemplary method of determining throughput and response time in a computing environment, in accordance with an embodiment of the present principles;

FIG. 5A shows a graphical depiction of system performance at default settings.

FIG. 5B shows a graphical depiction of system performance at settings that have been adjusted with respect to the default settings of FIG. 5A, and which represent a system adjusted in accordance with the visualized information provided by the present principles;

FIG. 6A shows a graphical depiction of system performance at default settings;

FIG. 6B shows a graphical depiction of system performance at settings that have been adjusted with respect to the default settings of FIG. 6A, and which represent a system adjusted in accordance with the visualized information provided by the present principles;

FIG. 7A shows a graphical depiction of the present principles that correlates CPU usage to response time data, presenting one other embodiment of a visual representation of system resources;

FIG. 7B shows a graphical depiction of the present principles that correlates throughput to CPU usage, presenting yet another other embodiment of a visual representation of system resources;

DETAILED DESCRIPTION

The present principles are directed to systems and methods for visualizing distributions of throughput and response time in a computing environment. The visualization, which in one embodiment is presented in a data plot, is determined based on collected throughput and response time data in a computing environment, e.g., for one or more machines of a computing environment. Implementation of the system and method should help a system operator improve the performance of a computer system through the making of suitable adjustments or through taking other appropriate action based on knowledge obtained from the visualized representation of distribution of throughput and response time.

In one embodiment, the plotted data points may be broken down into different classifications. For example, the plotted data may be classified in terms of ranges of response time speeds. In one embodiment, the classifications, e.g., response time speed ranges, are each designated with a unique visual indicator displayed in the data points. In one embodiment, the visual indicators are colors, with a unique color being assigned as a display of a particular range of response time speed. In another embodiment, the visual indicator may be shaded in grayscale, e.g., white, gray, black, and shades in between. In another embodiment, the visual indicator may be selected from a pattern.

In one embodiment, the data points have relatively large areas and the data points display two or more information classes, e.g., ranges of response time speeds, with a unique visual indicator assigned to each class.

It is believed that taking actions based on information conveyed to a system operator by the visualized representation of distribution of throughput and response time could improve the performance of a computing environment.

Figure 1:
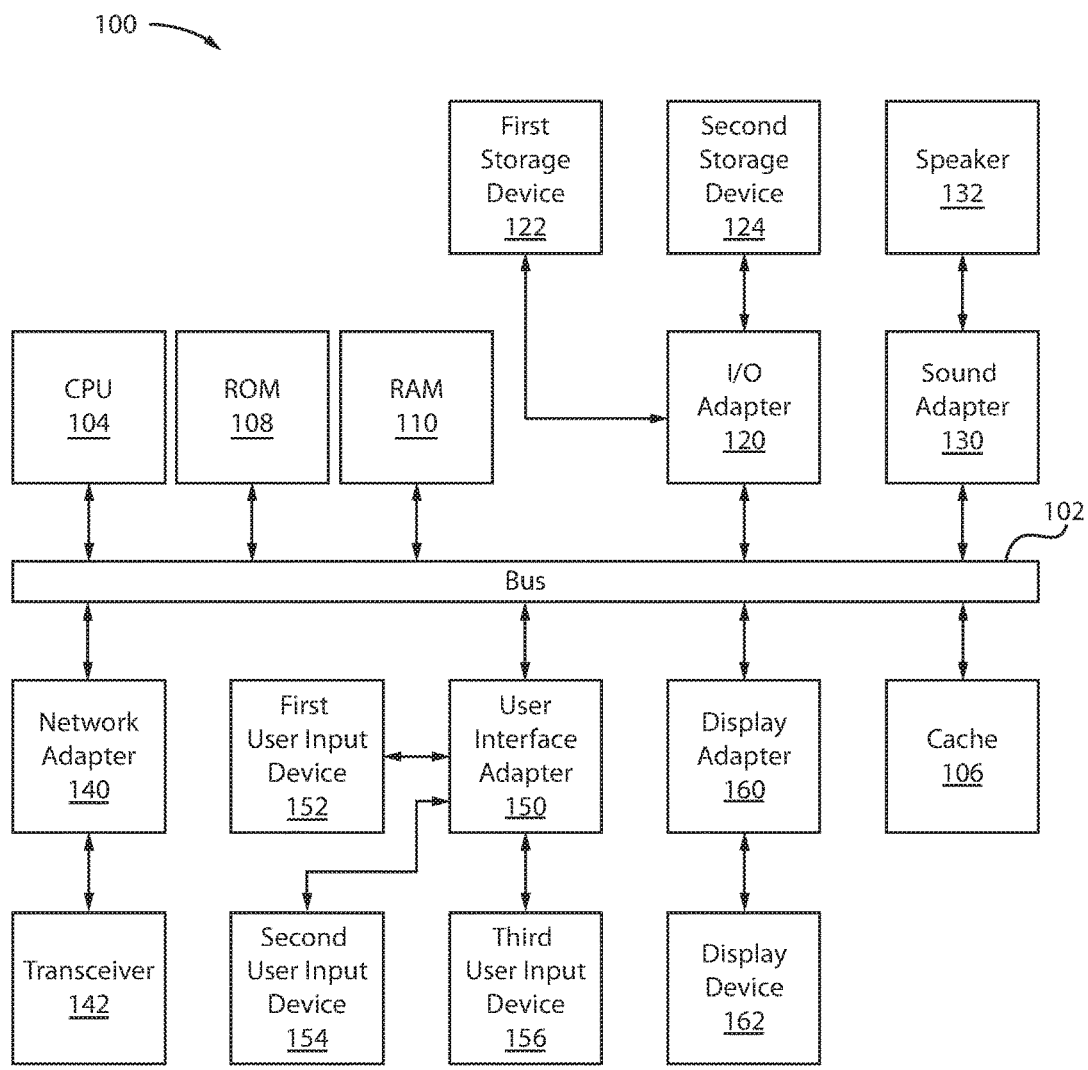
FIG. 1 an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160 are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
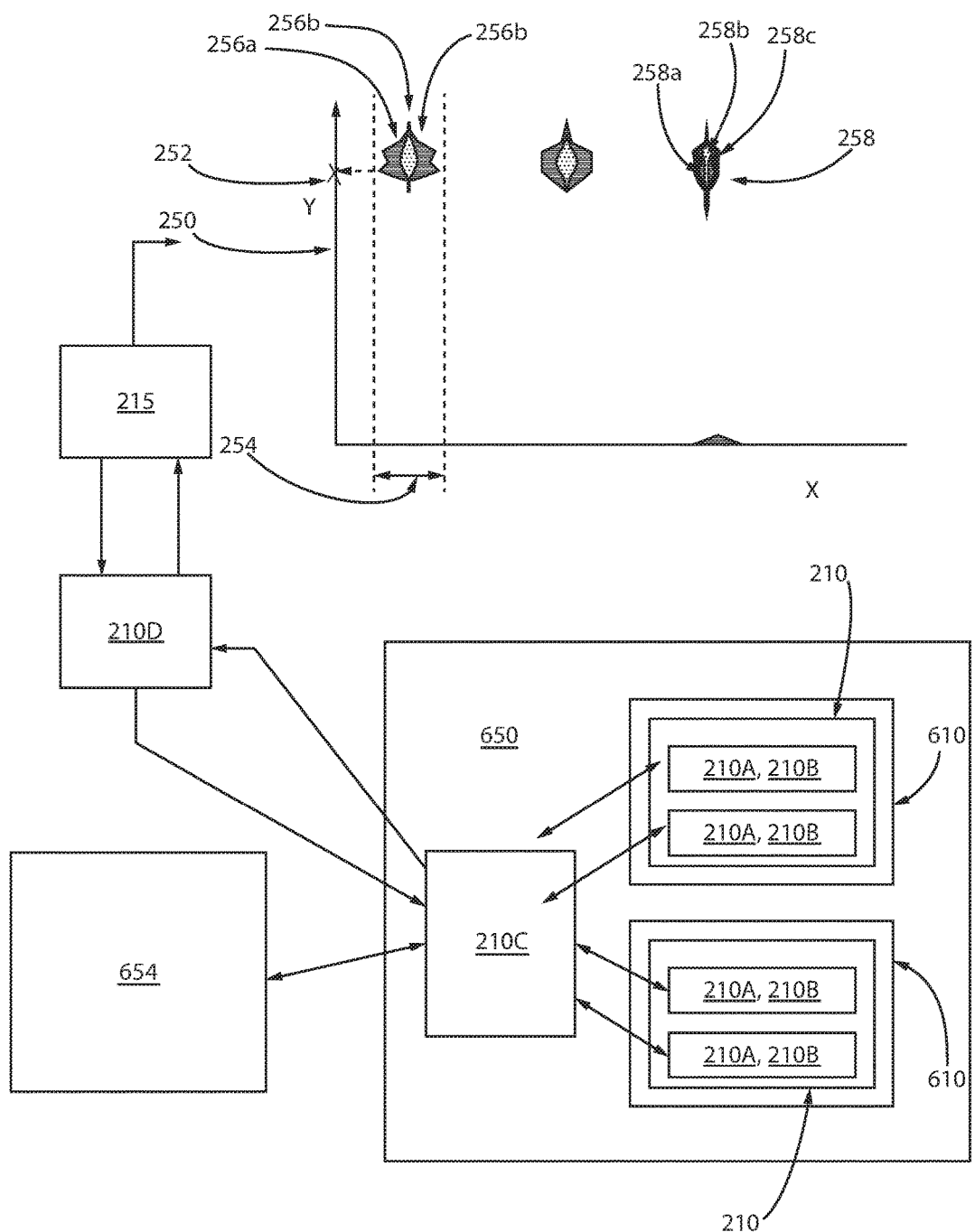
FIG. 2 shows one exemplary system of determining throughput and response time in a computing environment, in accordance with an embodiment of the present principles.
Figure 3:
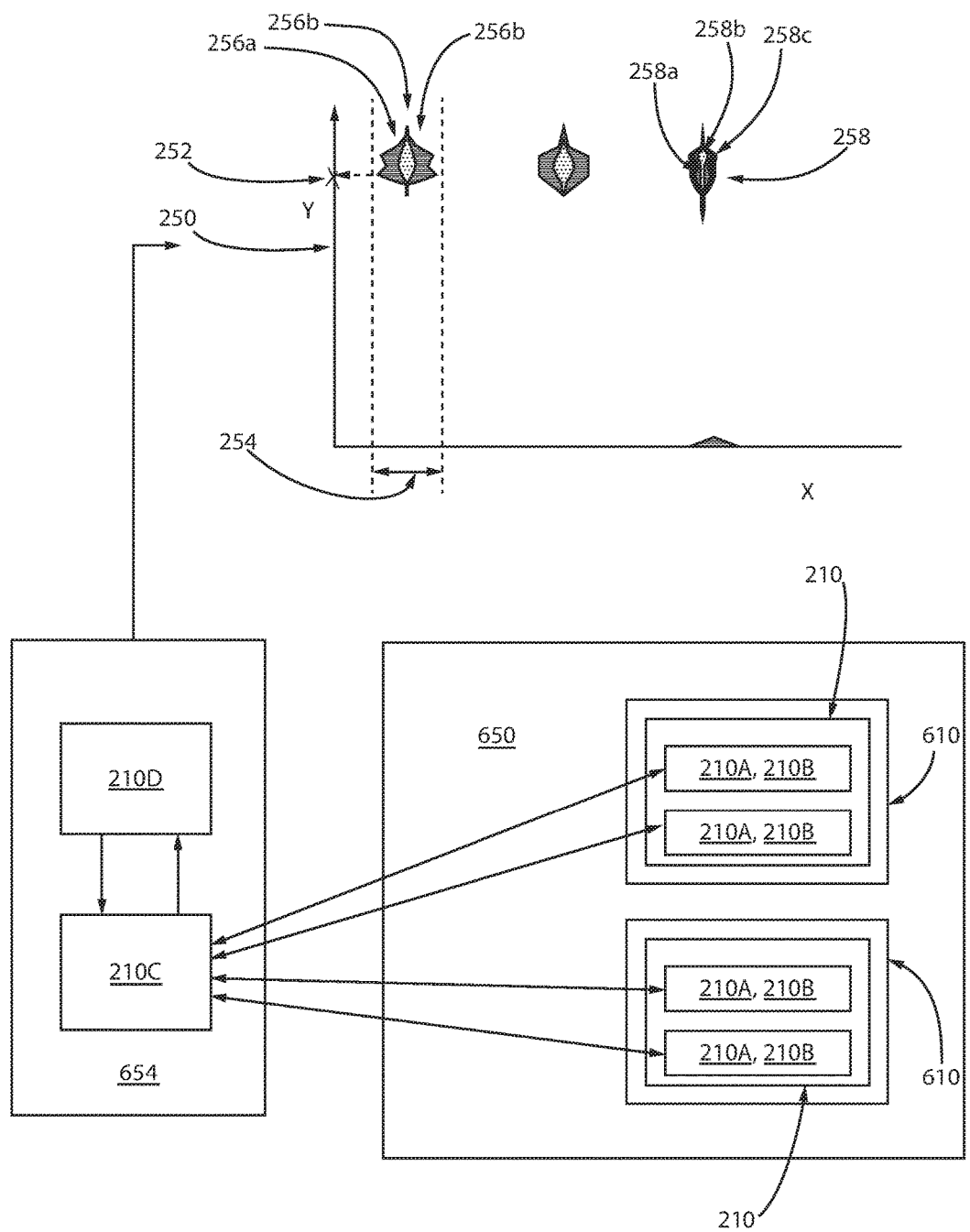
FIG. 3 shows another exemplary system of determining throughput and response time in a computing environment, in accordance with another embodiment of the present principles.

Referring to FIGS. 2 and 3, systems 200 for implementing respective embodiments of the present principles is shown. Part or all of processing system 100 may be implemented in one or more of the elements of systems 200.

Further, it is to be appreciated that processing system 100 may perform at least part of the method described herein including, for example, at least part of method 400 of FIG. 4. Similarly, part or all of systems 200 may be used to perform at least part of method 400 of FIG. 4.

Systems 200 of FIGS. 2 and 3 are exemplary systems for visualizing distributions of throughput and response time in accordance with the present principles. The cloud infrastructure 650 of FIG. 9 exemplifies the cloud infrastructure depicted in FIGS. 2 and 3. A system operator can employ a client device 654 to access, e.g., send a request to the cloud computing system 650 for services provided by the cloud computing environment. It should be understood that in many instances there will be numerous cloud client devices communicating with the cloud computing system at a given time.

With regard to present principles, a client device 654 sends a request for information pertaining to the identification and visualization of distribution of throughput and response time within the computing environment, e.g., information pertaining to throughput and response time of the cloud application servers 210 (hereinafter "servers") located within cloud computing system 650. The request may be an automated request or a manual request made by a system operator. In one embodiment, the request specifies the collecting of certain kinds of information, e.g. an instruction to collect, e.g., make a record of, the number of transactions for a selected number of intervals of a selected time duration (i.e., throughput), and to collect the amounts of time per transaction from when a transaction request is sent from a client device to when the clients device receives the response (i.e., response times) for a selected number of intervals of a selected time duration. In one embodiment, the time intervals may be a selected number of seconds or fractions thereof. The intervals may be in other units of time, e.g., minutes or hours. In one embodiment the request identifies one or more machines for which the information is to be collected. In another embodiment, the request specifies the start time and/or end time for collecting data. The start time could be immediate or in the future. The request could be for historical information, e.g., for data collected in a selected period of time in the past. The request may include an instruction to report the collected information to another device or system component, or to store same in another device or system component.

Referring to FIG. 2, servers 210 are located in one or more cloud computing nodes 610, which are in communication with a client device 654. The servers provide cloud computing functions in response to requests for services that are made by cloud computing clients. The servers may also provide functions relating to the present principles. The servers 210 include a processor or controller (hereinafter "controller") 210A, and memory 210B. A throughput and response time data collector 210C is shown in communication with the servers 210 located in the cloud computing nodes 610. A visual information determiner 210D is situated locally, operatively coupled to the throughput and response time data collector 210C and a system operator's computing device 215. Referring to FIG. 3, another embodiment is shown in which the servers include controller 210A and memory 210B. The throughput and response time data collector 210C is situated outside of the server environment, e.g., in client device 654, and is in communication with the servers 210 in the cloud computing nodes 610. The visual information determiner 210D is situated locally, for example, on the client device 654. In FIG. 3 the client device is the same as the local device of FIG. 2.

The throughput and response time data collector 210C could, for example, be a load balancer, e.g., a device that distributes workloads across multiple computing resources, such as computers, a computer cluster, network links, central processing units, and/or disk drives.

It should be understood that in addition to what is shown in FIGS. 2 and 3, other configurations are possible. For example, while the visual information determiner 210D is situated locally in the systems shown in FIGS. 2 and 3, it could be located on the servers 210. Whereas in FIG. 2 the throughput and response time data collector 210C is shown as located as within the cloud computing node 610, it could be located on the servers 210. Further, whereas in FIG. 3 the throughput and response time data collector 210C is shown as located as within the client device 654, it could situated outside of the client device, i.e., as a standalone device.

The servers 210 may be within a cloud computing environment, but this does not have to be the case. In another embodiment, the servers 210 can be local, i.e., present in a workplace environment. In one embodiment, the servers are in the same cloud computing environment which is being visualized in accordance with the present principles. In one embodiment, the servers are in another cloud. In yet another embodiment, the servers can be both local and remote, such that the local servers perform some of the functions implicated by the present principles, while the remote servers perform other functions implicated by the present principles.

In response to a request to collect information, the throughput and response time data collector 210C collects data regarding server activity, e.g., throughput and response time information, from the servers. For example, the number of transactions per second (throughput) that are performed by the servers and the lengths of times of the responses by the servers (i.e., time from sending of a transaction request by client device to receipt of response by client device) are collected. As indicated, in one embodiment, the throughput and response time data collector 210C is a load balancer device that collects the throughput and response time information regarding server activity from servers 210.

Visual information determiner 210D calculates the frequency distribution of response time and determines the visual representation of the collected information. In one embodiment, the visual information determiner 210D requests the information from the throughput and response time data collector 210C, which provides the visual information determiner 210D with the throughput and response time data.

The information visual information determiner 210D processes the information collected by the throughput and response time data collector 210C. For example, the visual information determiner 210D calculates a frequency distribution of response time that, e.g., is based on response times per intervals that are recorded in accordance with the request. In one embodiment, the generated calculation is made for a selected throughput range, herein designated by the variable (k). In one embodiment the throughput range (k) has at least one of an upper throughput limit and a lower throughput limit that, e.g., could be set in the request. The calculation is made for one or more machines, individually or in aggregate. In one embodiment, the aggregate is all machines in the cloud. In another embodiment, the aggregate is a subset of all of the machines in the cloud. In one embodiment, the subset includes all machines that are performing the same or a similar task, e.g., running a particular application.

In one embodiment, the visual information determiner 210D generates a two dimensional (2-D) plot for selected throughput ranges (k). In one embodiment, throughput is plotted along the y-axis. The width of a data point represents the frequency of throughput in range (k) for a given machine or group of machines. In one embodiment, several data points, representing the information for several machines or groups of machines, are displayed on a plot on a side-by-side basis with respect to the horizontal axis.

In one embodiment, in providing the information for a display of a 2-D plot of data points, the visual information determiner 210D generates data points that have relatively large areas. In one embodiment, the visual information determiner 210D generates relatively large data points with height dimensions (y-axis) that correspond to selected throughput ranges (k) bounded by at least one of an upper throughput limit and a lower throughput limit. The relatively large data points generated by the visual information determiner 210D have width dimensions that represent the frequencies of throughputs for the throughput ranges (k). As a result of fluctuations and changes in one or both of the ranges of throughputs and calculated frequencies of throughputs, the data points generated by the visual information determiner 210D may have unusual shapes.

In addition to the above, in one embodiment, the visual information determiner 210D classifies ranges of response time speeds within the data points. For example, one class may be a range of slower response time speeds, and a second class may be a range of faster response time speeds. In one embodiment, the visual information determiner 210D assigns a unique visual indicator to each class of response time speed.

In one embodiment, the visual indicator is a color of the visible light spectrum. In another embodiment, the visual indicator is a shade in grayscale, e.g., white, gray, black and shades in between. In yet another embodiment, the visual indicator is in a pattern, such as a combination of dots, dashes, etc. in different pattern combinations such as dot area, line thickness, dash length, line length, line direction, etc.

In one embodiment, information is categorized into a plurality of classifications within one or more data points. For example a given data point can include two or more classifications, which classifications are each designated with a unique color that is displayed within the data point. Merely by way of example, four classifications according to present principles could be present within a data point, the classifications being the ranges of the shortest, shorter, longer and longest response time speeds, with each classification being assigned a unique color that is displayed. By way of another example, less than four classifications according to present principles could be present, e.g., shorter, intermediate, longer ranges of response time speeds. According to present principles, other arrangements are possible.

The visual information determiner could, upon request or by forwarding, provide the information for generating a visual representation 250 of the distribution of throughput and response time to a display device that is operatively coupled to the system operator's local device 215, or to the client device 654, in the event that these devices are the same. The display device could be a computer monitor that would generate the visual representation. In another embodiment, the information for generating a visual representation 250 can be sent to a printer (not shown) that generates a printed document that displays the visual representation of the information.

The preceding description is intended to merely be illustrative. Thus, one of ordinary skill in the art will contemplate various other ways for visualizing distribution of throughput and response time in a computing environment, while maintaining the spirit of the present principles.

The memory 210B of servers 210 can store data relating to the present principles including, but not limited to, the collected data and the data generated in accordance with the present principles. In the case of the throughput and response time data collector 210C and visual information determiner 210D, these components can be implemented as software or implemented in part in software that can be stored in memory 210B. In one embodiment, the response time data collection and the visual information determinations can be performed different memory sectors of server memory 210B, e.g., collecting response time information can be performed in a first memory sector and visual information determinations can be performed in a second memory sector, or some other memory sector or sectors.

The throughput and response time data collector 210C and visual information determiner 210D can also be implemented as least in part in hardware, including standalone devices, boards, integrated circuits, and so forth. In an embodiment, at least one of the throughput and response time data collector 210C and visual information determiner 210D are implemented as application specific integrated circuits (ASICS). These and variations of the elements of system 200 are readily contemplated by one of ordinary skill in the art given the teachings of the present principles provided herein, while maintaining the spirit of the present principles.

The visual information determiner 210D provides the information displayed in the visual representation 250, which is a plot of data where the Y axis depicts the throughput for a machine or groups of machines. The throughput can be plotted for a selected range that is bounded by a threshold throughput value 252 which, e.g., is a lower limit threshold throughput value. The width 254 of data point 256 represents the frequency of throughput in range (k) for a given machine or group of machines. Within data point 256, two classes of information 256A, 256B are identified, each corresponding to an area of the data point 256. Class 256A is of relatively dark shading and is positioned in two parts on the outer sides of data point 256. Class 256A is a class that identifies a range of longer response time speeds. Class 256B, located in the central portion of data point 256, is of a lighter shading. Class 256B is a class that identifies a range of shorter response time speeds.

Data point 258 includes three information classifications. An outer class 258C is a class that identifies a range of response time speeds that is longer than the response times of classes 258A and 258B, which correspond to the ranges of response time speeds described in relation to data point 256. Outer class 258C is shaded darker than classes 258A and 258B.

The visual information determiner 210D processes the information received from the throughput and response time data collector 210C and provides the information for a visual representation of distributions of throughput and response time, e.g., by providing information to generate a plot of data points that include designations of information classes, e.g., the ranges of response time speeds for a given machine or machines.

Referring to FIG. 4, an exemplary method 400 for visualizing the distribution and response time in a computing environment, in accordance with an embodiment of the present principles, is shown.

As described previously, a request for information pertaining to the identification and visualization of distribution of throughput and response time within a computing environment is made. In one embodiment, the request defines a throughput range having at least one of an upper throughput limit and a lower throughput limit, the machines for which information is to be provided in a visualization such as plot 252, the number of intervals for which information is to be collected and the length, as measured by time (e.g., duration), for the intervals.

In block 410, the throughput and response time information for one or more (≥1) machines is collected over a selected number of intervals for a selected interval duration. The sum of the time segments equals the total duration for which information is recorded.

In block 420, the frequency distribution of response time for throughput in a predetermined throughput range (k) is calculated.

In block 430, the creation of a visual representation of distribution of throughput and response time commences. Throughput in the throughput range (k) is plotted on the y axis. In one embodiment, the throughput range (k) will be bounded by one of a lower throughput limit and an upper throughput limit. In another embodiment throughput range will have an upper throughput limit and a lower throughput limit.

In block 440, the frequency of throughput is plotted in a width dimension for the throughput range (k), whereby data points for the throughput range are generated.

In block 450, ranges of response time speeds are classified in the data points and a unique visual indicator is assigned to each class. The visual indicators for the classes will be displayed in the visual representation.

In block 460, a visual representation is generated that displays data points defined by a throughput range (k) in a height dimension along a y axis and a frequency of throughput in the range (k) in a width dimension. The data points are broken into classifications of response time speeds, with each class being assigned a unique visual indicator, e.g., a color unique to each class that is displayed.

For example, the visual representation could provide information showing that shared memory resources are in an overcommitted state, the system is not performing efficiently, and system response times are too long. The plotted data 252 could visually represent this with data points having relatively wide ranges of long response time speeds within a given data point. For example, the outer portion 256A of data point 256 shown in FIGS. 2 and 3 is relatively wide. Outer portion 256A designates, by shading or color, relatively long response time speeds. The reader of the data could use this information to adjust the parameters that affect the performance of the machine(s) represented by data point 256, or commit resources in some other way to reduce the load on the machine(s) represented by data point 256.

There are several advantages the flow from implementing the present principles over conventional solutions, such as, e.g.:

(A) System information is depicted visually in easy-to-understand manner. Depicting the performance of machines in a side-by side manner allows the reader of the data to decide where resources should be committed, if necessary;

(B) Other graphical representations, such as scatter plots and histograms can be difficult to read. For example, the data in these representations may plot in an overlapping manner. Such disadvantages are avoided when implementing the present principles;

(C) Machine performance across the system is easily compared. With relative ease, it can be determined which resources are overcommitted and which are not;

(D) The effects of tuning system parameters, such as adjusting memory swap, are easily ascertained; and (E) The system and method in accordance with present principles allows for the plotted information to be analyzed and acted upon in a real time manner. The system and method also allow for the use of previously collected information to be used to predict system performance at a time in the future, which predictions can be employed to proactively avoid issues of system performance deterioration.

FIG. 5A depicts a system set for a default parameters, e.g., a default swappiness setting. Data points 260, 262 represent not-overcommitted system conditions in which system performance could be regarded as acceptable. Data point 264 represents an overcommitted condition in which system performance is degraded. Data point 265 is indicative of poor system performance (little to no throughput). In comparing data points 260, 262 and 264, it can be seen that the former two data points are wider than data point 264, which could be interpreted as demonstrating a wider range of throughput frequency for the machines represented by data points 260, 262 than for the machines represented by data point 264. Further, data point 264 shows that there is a slower class of response time speeds than is present in data points 260, 264.

FIG. 5B depicts a system that has undergone performance tuning. Data points 266, 268 represent good system conditions with no overcommitment of resources. Relatively wide bands of faster response time ranges near the top of the data points 266, 268 could be interpreted as a favorable processing condition, i.e., the machine is responding to requests relatively quickly.

FIG. 6A depicts a system set for a default performance setting, and FIG. 6B depicts a system with an adjusted performance setting. The data points on the side 280 of vertical line 285 represent not-overcommitted system conditions and the data points on the side 290 of vertical line 285 represent overcommitted conditions. Directly comparing the data points depicted in FIGS. 6A, 6B allows the reader of the data to rapidly develop an understanding of the effects of adjusting the effect of tuning system performance. FIG. 6A can be interpreted as showing that throughput significantly degrades during overcommit conditions, e.g., machines are processing requests very slowly or not at all. In comparison, with system performance adjustments, the machines represented in FIG. 6B can be interpreted as performing very well in overcommit conditions.

While the present principles are explained with regard to the visualization of throughput and response time, it should be understood that the principles could be applied to visually representing other types of data. For example, central processing unit (CPU) usage can be correlated with response times. FIG. 7A shows a plot of CPU usage on the Y-axis and the visual indicator (e.g., a color, a greyscale shade, a pattern) within the data points represents response time speeds. The data points on the left side of FIG. 7A represent a computing environment in which the machines are under load, yet functioning properly. The data points on the right side of FIG. 7A represent a computing environment that is not performing adequately, due to, e.g., slow response times.

As another example, CPU usage can be correlated with throughput. FIG. 7B shows a plot of throughput on the Y-axis and the visual indicator (e.g., a color, a greyscale shade, a pattern) within the data points represents classes of CPU usage (bright color represents lower CPU usage, and darker color represents higher CPU usage. With this visual representation according to present principles, system conditions with respect to available resources is depicted.

It should be understood that according to present principles, the described throughput and response time data collector 210C can be adapted to collect other kinds of data to be correlated, e.g., response time and CPU usage, and CPU usage and throughput. Similarly the visual information determiner can be adapted to provide a visual representation of correlated data, e.g., response time and CPU usage, and CPU usage and throughput.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
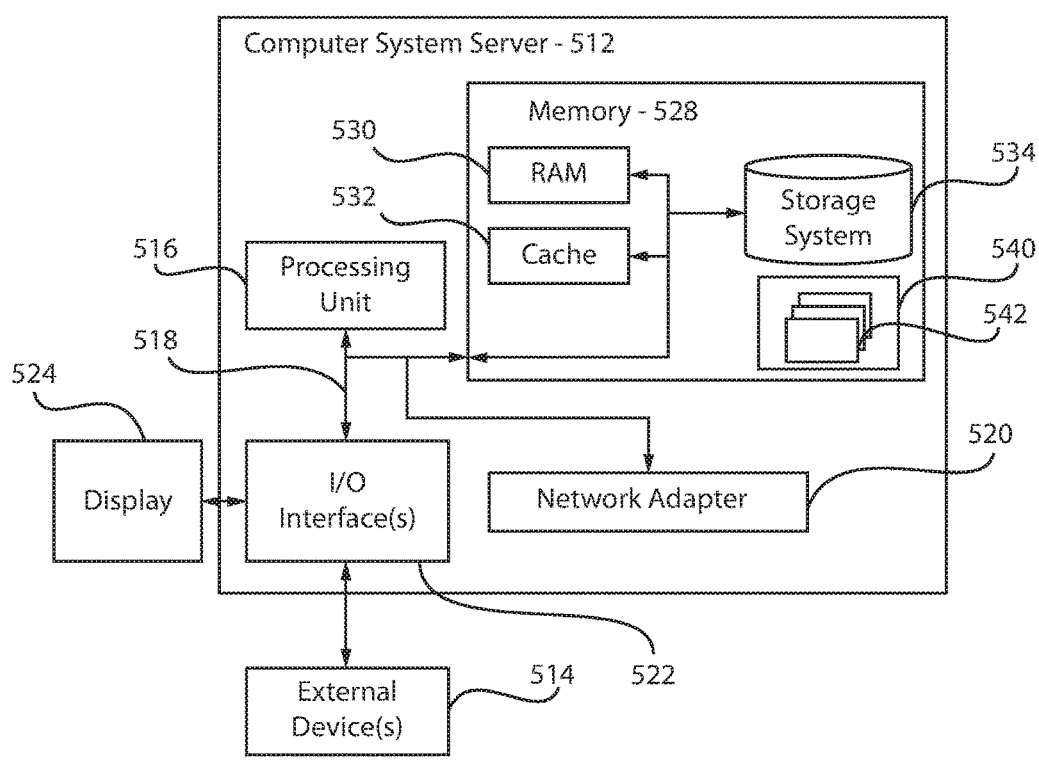
FIG. 8 shows an exemplary cloud computing node in accordance with an embodiment representative of a node for requesting cloud computing services.

Referring now to FIG. 8, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Figure 9:
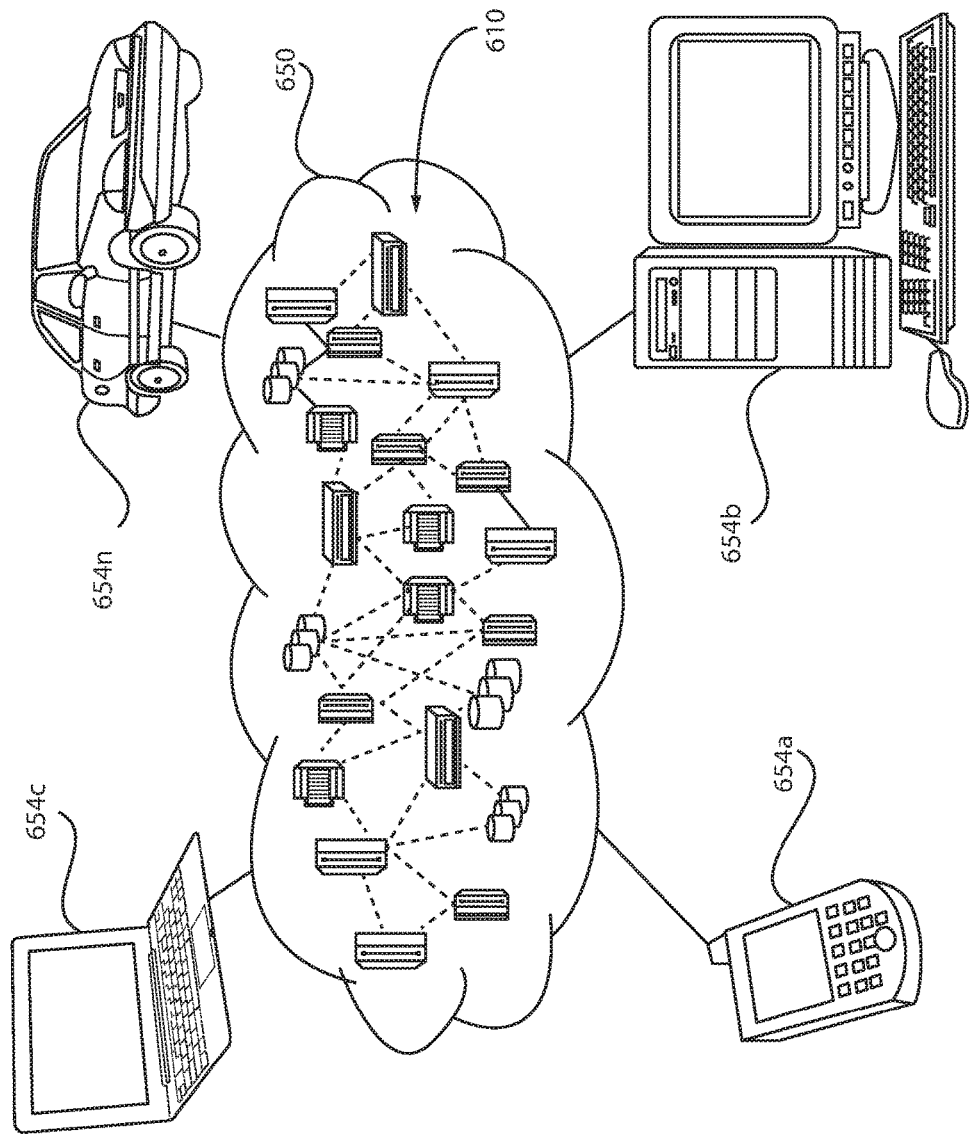
FIG. 9 shows an exemplary cloud computing environment in accordance with an embodiment of the present principles that is representative of a computing environment in which present principles may be applied.

Referring now to FIG. 9, illustrative cloud computing environment 650 is depicted. As shown, cloud computing environment 650 comprises one or more cloud computing nodes 610 with which client devices 654 used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of devices 654A-N are intended to be illustrative only and that computing nodes 610 and cloud computing environment 650 can communicate with any type of computerized device over any type of network and/or network addressable connection (e.g., using a web browser).

Figure 10:
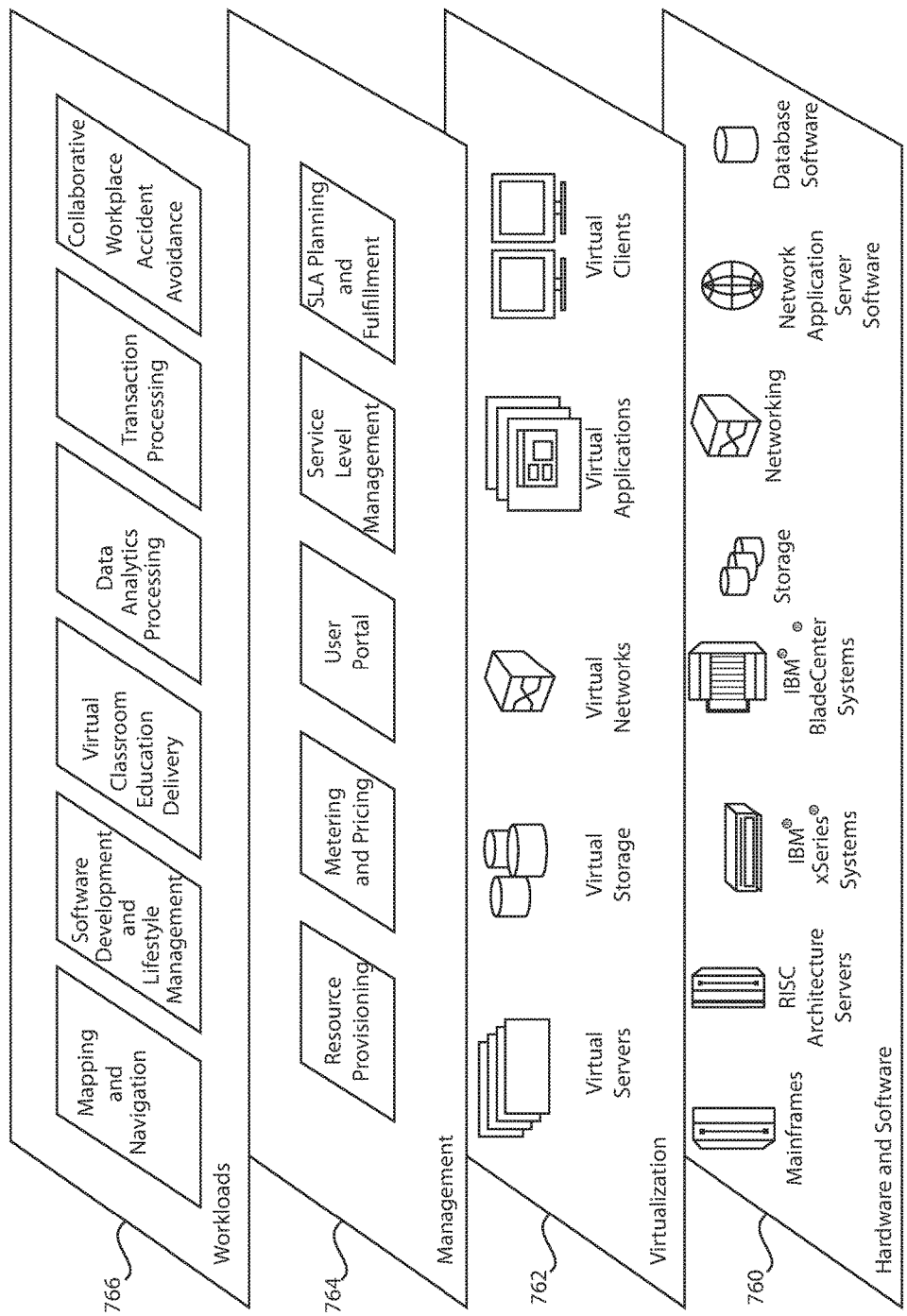
FIG. 10 shows exemplary abstraction model layers provided by cloud computing environment, that could be subject to a visualized representation embodying the present principles.

FIG. 10 shows a set of functional abstraction layers provided by cloud computing environment 650. It should be understood in advance that the components, layers, and functions shown in FIG. 10 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and collaborative workplace accident avoidance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of visualizing distributions of throughput and response time, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for improving performance of a computing environment, comprising:
   collecting correlated data for a selected number of intervals each having a selected duration of time, the correlated data including throughput data and response time data obtained from one or more computing machines in the computing environment;
   creating a visualized representation of the collected correlated data using at least one hardware processor, the visualized representation displaying computing machine performance of the one or more computer machines plotted in a data plot, the data plot having one or more data points comprising one or more classes of computing machine performance information that are represented by displaying one or more unique visual indicators assigned to respective ones of the one or more classes of computing machine performance information; and
   improving the performance of the computing environment by adjusting a setting of at least one of the one or more computing machines based on the visualized representation.

2. The method of claim 1, further comprising reviewing the visualized representation of the correlated data.

3. The method of claim 1, wherein the correlated data further includes correlated data selected from the group consisting of: central processing unit usage and throughput data, central processing unit and response time data, and combinations thereof.

4. The method of claim 3, wherein the throughput and response time data is collected for the one or more computing machines in a selected throughput range having at least one of an upper limit and a lower limit.

5. The method of claim 1, wherein the one or more classes of computing machine performance information include one or more classes of response time speeds, and wherein the one or more unique visual indicators include one or more visual indicators selected from the group consisting of: a unique color, a unique grayscale shade, a unique pattern that is assigned to each class of response time speeds, and combinations thereof.

6. The method of claim 5, further comprising:
   plotting, for the one or more computing machines, throughput data on a y-axis of a data plot and frequency of throughput in a width dimension on the data plot in correspondence with the plotted throughput data to provide one or more data points representing throughput and frequency of throughput for the one or more computing machines;
   creating, in the one or more data points, the one or more classes of response time speeds; and
   assigning a visual indicator unique to each class of response time speeds.

7. The method of claim 6, wherein one or more data points include a plurality of classes of response time speeds, the method further comprising:
   designating a data point outer region as a first response time class of relatively slower speeds;
   designating a data point inner region as a second response time class of relatively faster speeds; and
   assigning a unique color to be displayed for each of the first and second response time classes.

8. A system for improving performance of a computing environment, comprising:
   one or more servers having a processor and memory;
   a computer system data collector, for collecting two or more kinds of correlated data for a selected number of intervals each having a selected duration of time, the correlated data including throughput data and response time data obtained from the one or more servers;
   a visual information determiner, for creating a visual representation of the collected correlated data, the visualized representation displaying server performance of the one or more servers plotted in a data plot that visually correlates the collected correlated data, the data plot having one or more data points including one or more classes of server performance information that are represented by displaying one or more unique visual indicators assigned to respective ones of the one or more classes of server performance information; and
   a data display device, for displaying the visual representation as an image;
   wherein a performance of the computing environment is improved by adjusting a setting of at least one of the one or more servers based on the visualized representation.

9. The system of claim 8, wherein the correlated data further includes correlated data selected from the group consisting of: central processing unit usage and throughput data, central processing unit and response time data, and combinations thereof.

10. The system of claim 8, wherein the one or more classes of server performance information include one or more classes representing ranges of response time speeds.

11. The system of claim 10, wherein the one or more unique visual indicators include one or more visual indicators selected from the group consisting of: a unique color, a unique grayscale shade, a unique pattern that is assigned to each class of response time speeds, and combinations thereof.

12. The system of claim 11, wherein the visual information determiner:

plots, for the one or more servers, throughput data on a y-axis of a data plot and frequency of throughput in a width dimension on the data plot in correspondence with the plotted throughput data to provide one or more data points representing throughput and frequency of throughput for the one or more servers;

creates, in the one or more data points, the one or more classes of response time speeds; and assigns a visual indicator unique to each class of response time speeds.

13. The system of claim 12, wherein the visual information determiner:

designates a data point outer region as a first response time class of relatively slower speeds;

designates a data point inner region as a second response time class of relatively faster speeds; and assigns a unique color for each of the first and second response time classes to display.

14. A computer program product for improving performance of a computing environment, the computer program product comprising a non-transitory computer readable storage medium having program instructions embodied therewith, the program instructions executable by a computer to cause the computer to perform a method, the method comprising:

collecting the correlated data for a selected number of intervals each having a selected duration of time, the correlated data including throughput data and response time data obtained from one or more computing machines in the computing environment; and creating a visualized representation of the collected correlated data, the visualized representation displaying computing machine performance of the one or more computing machines plotted in a data plot, the data plot having one or more data points comprising one or more classes of computing machine performance information that are represented by displaying one or more unique visual indicators assigned to respective ones of the classes of computing machine performance information; and wherein a performance of the computing environment is improved by adjusting a setting of at least one of the one or more computing machines based on the visualized representation.

15. The computer program product of claim 14, wherein the correlated data further includes data selected from the group consisting of: central processing unit usage and throughput data, central processing unit and response time data, and combinations thereof.

16. The computer program product of claim 15, wherein the method further comprises wherein the one or more classes of computing machine performance information include one or more classes of response time speeds, and wherein the one or more unique visual indicators include one or more visual indicators selected from the group consisting of: a unique color, a unique grayscale shade, a unique pattern that is assigned to each class of response time speeds, and combinations thereof.

17. The computer program product of claim 16, wherein the method further comprises:

plotting, for the one or more computing machines, throughput data on a y-axis of a data plot and frequency of throughput in a width dimension on the data plot in correspondence with the plotted throughput data to provide one or more data points representing throughput and frequency of throughput for the one or more computing machines;

creating, in the one or more data points, the one or more classes of response time speeds; and assigning a visual indicator unique to each class of response time speeds.

* * * * *